US012617367B2

(12) United States Patent
Fischer et al.

(10) Patent No.: US 12,617,367 B2
(45) Date of Patent: May 5, 2026

(54) PLEATED AIRBAG CONSTRUCTION

(71) Applicant: ZF Passive Safety Systems US Inc., Washington, MI (US)

(72) Inventors: Kurt Fischer, Rochester, MI (US); Douglas Gould, Lake Orion, MI (US); David Varcoe, Bruce Township, MI (US); Paul Lange, Dryden, MI (US); Alexandra Smith, Richmond, MI (US)

(73) Assignee: ZF PASSIVE SAFETY SYSTEMS, US INC., Washington, MI (US)

( * ) Notice: Subject to any disclaimer, the term of this patent is extended or adjusted under 35 U.S.C. 154(b) by 0 days.

(21) Appl. No.: 18/659,156

(22) Filed: May 9, 2024

(65) Prior Publication Data

US 2025/0346205 A1      Nov. 13, 2025

(51) Int. Cl.
| | |
|---|---|
| *B60R 21/2338* | (2011.01) |
| *B60R 21/207* | (2006.01) |
| *B60R 21/214* | (2011.01) |
| *B60R 21/231* | (2011.01) |

(Continued)

(52) U.S. Cl.
CPC ........ *B60R 21/2338* (2013.01); *B60R 21/207* (2013.01); *B60R 21/214* (2013.01); *B60R 21/233* (2013.01); *B60R 2021/23153* (2013.01); *B60R 2021/23308* (2013.01); *B60R 2021/23382* (2013.01); *B60R 2021/23386* (2013.01); *B60R 2021/23571* (2013.01)

(58) Field of Classification Search
CPC . B60R 21/2338; B60R 21/207; B60R 21/214; B60R 21/233; B60R 2021/23153; B60R 2021/23308; B60R 2021/23382; B60R 2021/23386; B60R 2021/23571

USPC ................................... 280/730.1, 739, 743.1
See application file for complete search history.

(56) References Cited

U.S. PATENT DOCUMENTS

| | | | | |
|---|---|---|---|---|
| 7,207,594 B2* | 4/2007 | Igawa | ................... | B60R 21/231 280/730.1 |
| 8,764,055 B2* | 7/2014 | Fischer | ................. | B60R 21/205 280/739 |
| 9,308,883 B1* | 4/2016 | Schneider | ............. | B60R 21/231 |

(Continued)

FOREIGN PATENT DOCUMENTS

DE          102015100504 A1      7/2016

OTHER PUBLICATIONS

PCT Search Report and Written Opinion for corresponding International application No. PCT US2025/028313 mailed Jul. 23, 2025, pp. 1-17.

*Primary Examiner* — Paul N Dickson
*Assistant Examiner* — Caitlin Anne Miller
(74) *Attorney, Agent, or Firm* — Tarolli, Sundheim, Covell & Tummino LLP

(57) ABSTRACT

An airbag for helping to protect an occupant of a vehicle includes first and second panels each comprising a periphery having substantially identical configurations, wherein the first and second panels are positioned overlying each other and connected to each other via a perimeter connection that extends along their peripheries to define an inflatable volume of the airbag. The first panel includes a pleat configured to increase the area of the first panel over that of the second panel while the configurations of the peripheries of the first and second panels remain substantially identical, wherein the pleat is configured to form a bend in the airbag when the airbag is inflated.

20 Claims, 11 Drawing Sheets

(51) Int. Cl.
    *B60R 21/233*     (2006.01)
    *B60R 21/235*     (2006.01)

(56)               References Cited

U.S. PATENT DOCUMENTS

| | | | |
|---|---|---|---|
| 9,340,174 B1 * | 5/2016 | Paxton | B60R 21/231 |
| 9,707,921 B2 | 7/2017 | Fischer et al. | |
| 10,336,282 B2 | 7/2019 | Fischer et al. | |
| 10,525,927 B2 | 1/2020 | Fischer et al. | |
| 11,305,720 B2 | 4/2022 | Fischer et al. | |
| 11,498,509 B2 * | 11/2022 | Fischer | B60R 21/261 |
| 11,938,888 B2 * | 3/2024 | Fischer | G02B 13/06 |
| 11,993,219 B2 * | 5/2024 | Fischer | B60R 21/2338 |
| 2017/0113646 A1 * | 4/2017 | Lee | B60R 21/2338 |
| 2017/0291566 A1 * | 10/2017 | Karlow | B60R 21/231 |
| 2019/0161049 A1 * | 5/2019 | Thomas | B60R 21/264 |
| 2019/0241145 A1 * | 8/2019 | Hiruta | B60R 21/207 |
| 2020/0114860 A1 | 4/2020 | Fisher | |
| 2020/0406852 A1 * | 12/2020 | Fischer | B60R 21/26 |
| 2021/0101559 A1 | 4/2021 | Fisher | |
| 2023/0026681 A1 * | 1/2023 | Fischer | B60R 21/2338 |

* cited by examiner

SENSOR/
CONTROLLER

PLEATED AIRBAG CONSTRUCTION

TECHNICAL FIELD

The present invention relates generally to occupant safety systems and, in particular, to occupant safety systems including airbags, such as roof-mounted and seat-mounted airbags.

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle. Frontal airbags can be driver airbags or passenger airbags. When inflated, the driver and passenger airbags help protect the occupant from impacts with parts of the vehicle such as the instrument panel and/or a steering wheel of the vehicle.

Other types of airbags include side airbags and curtain airbags, both of which are inflatable between a seated occupant and a side structure of the vehicle. When inflated, the side and curtain airbags help protect the occupant from impacts with the side structure of the vehicle.

There are trends in the auto industry to make vehicles more spacious. Styling has been making the instrument panel smaller and thus farther away from the occupant. State-of-the-art sensors and artificial intelligence (AI), combined with active and passive safety technologies, can help to prevent accidents or mitigate their consequences. These include intelligent driver assist systems with automated emergency driving maneuvers as well as external side airbags or the detection of the occupants seating position. Autonomous driving technologies can eliminate the need for some of the vehicle structure that is common to current vehicle architectures, leading to new interior concepts in which the occupant's seating position can vary.

With these realities as a backdrop, the paradigm of occupant safety systems has shifted. In the past, the necessity of a vehicle operator/driver lent to a somewhat standard vehicle passenger cabin configuration. In the U.S., the driver is a front seat, left side, forward facing occupant within reach of the vehicle controls and instrumentation (steering wheel, pedals, instrument panel, console, etc.). This driver configuration helps dictate the layout of the remainder of the vehicle—front seat, forward-facing passenger-side occupant, rear seat (second row, third row, etc.) forward-facing occupants. Accordingly, in the past, occupant safety systems were typically designed with this passenger cabin layout and the associated occupant positions and orientations in mind.

The autonomous or semi-autonomous vehicle allows vehicle passengers to be positioned and oriented away from the conventional positions/orientations described above. Predetermined passenger arrangements, such as all forward-facing occupants, or vehicle structural configurations, such as steering wheel/instrument panel configurations, center console configurations, foot well, pedal controls, etc., might not be assumed. Additionally, even in conventionally driven vehicles, trends in vehicle design are evolving such that the configurations of vehicles in the area of the instrument panel can make it difficult or impossible to utilize these traditional structures as reaction surfaces for airbags mounted thereon.

This presents the challenge of not only where to locate airbag systems, but also finding reaction surfaces against which to position the airbags so they can absorb impacts. Typically, instrument panel and steering wheel mounted frontal airbags utilize those structures as a reaction surface against which the airbag rests so that it can oppose, cushion, and absorb the impact energy of an impacting occupant and provide a desired ride-down effect. In modern vehicles, including autonomous, semi-autonomous, or conventionally driven vehicles, however, the vehicle may not have an instrument panel or steering wheel at all, or one that cannot accommodate a traditional airbag module. Even if there is structure sufficient to support an airbag in the traditional locations, in the case of autonomous or semi-autonomous vehicles, the occupants can be positioned and oriented outside the traditional manner, thus impacting the ability of the airbag to provide optimal protection.

SUMMARY

A vehicle occupant safety system includes an airbag with a pleated structure that causes the airbag to bend at predetermined locations. The pleated configuration is tailored to produce an overall shape of the airbag that results in the desired airbag coverage. In one example configuration, the airbag can be configured to be roof-mounted. In another example configuration, the airbag can be configured to be mounted on a seatback positioned in front of the occupant, e.g., a front seatback mounted airbag configured to protect a rear seat occupant.

The airbag can have a simple two panel configuration where the panels are stitched or otherwise interconnected to produce a cushion with a uniform configuration, such as a flat, rounded rectangular configuration. The panels can be interconnected within the periphery of the cushion to form chambers, for example, parallel chambers extending the length of the cushion. Pleats can be formed in one of the panels in order to add to the surface area of the panel in the region of the pleat. During inflation, the increased surface area provided by the pleats cause the bends for form in the cushion. Due to the pleats and the bends introduced thereby, the airbag takes on a curved configuration with a convexly curved portion in the area of the pleats. In one example configuration, the airbag can be configured to be positioned so that the occupant's head impacts and penetrates the curved portion of the panel facing the occupant in response to a vehicle collision. The airbag can also be configured such that the curved portion of the airbag unbends in response to this penetration.

According to one aspect, an airbag for helping to protect an occupant of a vehicle includes first and second panels each comprising a periphery having substantially identical configurations, wherein the first and second panels are positioned overlying each other and connected to each other via a perimeter connection that extends along their peripheries to define an inflatable volume of the airbag. The first panel includes a pleat configured to increase the area of the first panel over that of the second panel while the configurations of the peripheries of the first and second panels remain substantially identical, wherein the pleat is configured to form a bend in the airbag when the airbag is inflated.

According to another aspect, alone or in combination with any other aspects, the peripheries of the first and second panels can be substantially equal in length.

According to another aspect, alone or in combination with any other aspects, the peripheries of the first and second panels can have substantially identical shapes.

According to another aspect, alone or in combination with any other aspects, the first panel can have a first piece and a second piece that are connected to each other via a connection. The first piece can include a main portion with a periphery that corresponds to a portion of the periphery of the first panel, and an end portion with a periphery that does not form a portion of the periphery of the first panel. The second piece can include a main portion with a periphery that corresponds to a portion of the periphery of the first panel, and an end portion with a periphery that does not form a portion of the periphery of the first panel. The end portions of the first and second pieces can be connected to each other via a connection, with the interconnected end portions of the first and second pieces forming the pleat. The pleat can be positioned between the main portions of the first and second pieces.

According to another aspect, alone or in combination with any other aspects, the peripheries of the end portions of the first and second pieces can have matching curved configurations. The connection connecting the end portions of the first and second pieces can have opposite ends that intersect the peripheral connection on opposite sides of the airbag.

According to another aspect, alone or in combination with any other aspects, the airbag can be configured to position the bend in the airbag at a location on the airbag configured to receive the occupant's head.

According to another aspect, alone or in combination with any other aspects, the airbag can include connections that interconnect the first and second panels to define chambers within the inflatable volume of the airbag. The connections that interconnect the first and second panels to define chambers within the inflatable volume of the airbag can be tethers.

According to another aspect, alone or in combination with any other aspects, the airbag can have a first end portion configured to be mounted to the vehicle structure at a mounting location on the vehicle. The bend can be configured to control the shape of the airbag so that the airbag is positioned at a desired location relative to the occupant when deployed.

According to another aspect, alone or in combination with any other aspects, the airbag can include a first pleat configured to define a first bend in the airbag, and a second pleat configured to define a second bend in the airbag. The first and second pleats can define the first end portion, a second end portion, and a middle portion extending between the first and second end portions from the first pleat to the second pleat. The first end portion can be configured to be mounted to the vehicle structure and to extend along the vehicle structure. The first bend can be configured to cause the middle portion to extend away from the vehicle structure toward the vehicle occupant. The second bend can be configured to cause the second end portion to extend downward in front of the occupant.

According to another aspect, alone or in combination with any other aspects, the vehicle structure can be a roof of the vehicle. The first end portion can be configured to extend along the vehicle roof. The middle portion can be configured to extend downward from the vehicle roof toward the occupant. The second end portion can be configured to extend downward in front of the occupant.

According to another aspect, alone or in combination with any other aspects, the vehicle structure can include a seatback of a vehicle seat positioned in front of a vehicle seat upon which the occupant is seated. The first end portion can be configured to extend upward along the seatback. The middle portion can be configured to extend rearward from the seatback toward the occupant. The second end portion can be configured to extend downward in front of the occupant.

According to another aspect, alone or in combination with any other aspects, the airbag can include an external tether that interconnects two of the first end portion, second end portion, and middle portion.

According to another aspect, alone or in combination with any other aspects, the airbag can be configured so that the second bend is positioned in front of a head of the occupant and so that the second end portion extends from the occupant's head down along the occupant's torso and terminates adjacent upper legs of the occupant. The second end portion can be configured to be impinged between the occupant's upper legs and the occupant's torso as the occupant leans forward into engagement with the airbag in response to a vehicle collision.

According to another aspect, an airbag module can include an airbag in accordance with any of the preceding aspects. The airbag module can also include an inflator that is actuatable to produce inflation fluid for inflating and deploying the airbag, and a housing for supporting the airbag and inflator.

According to another aspect, a vehicle safety system can include the airbag module of the preceding aspect. The vehicle safety system can also include a sensor for sensing the occurrence of an event for which deployment of the airbag is desired and producing a signal indicative thereof, and a controller connected to the sensor. In response to receiving the signal, the controller can actuate the inflator to inflate and deploy the airbag.

DRAWINGS

DESCRIPTION

Figure 1:
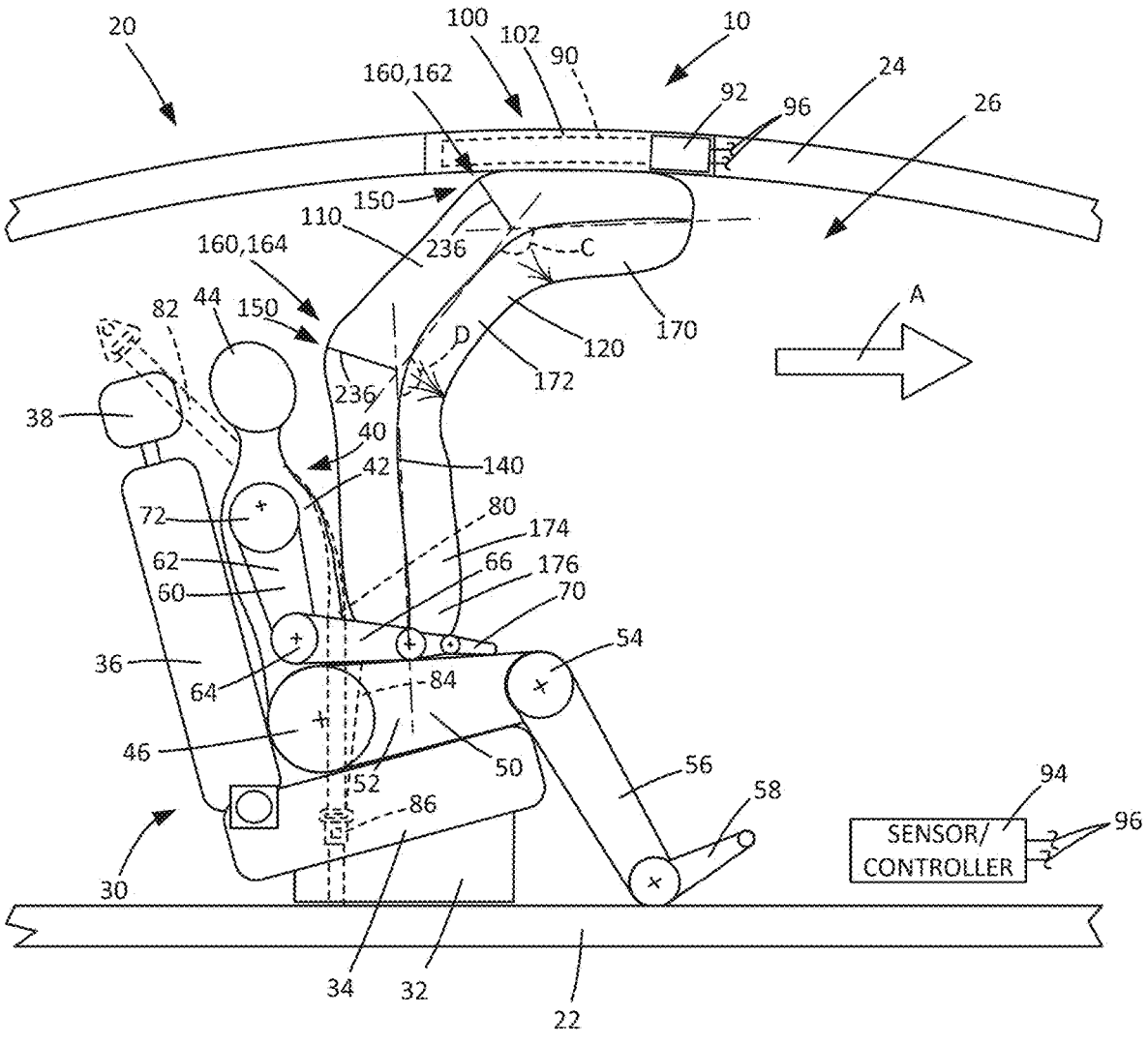
FIG. 1 is a schematic illustration of an apparatus for helping to protect an occupant of a vehicle illustrating the apparatus in a deployed condition, according to a first example configuration.

Referring to FIG. 1, according to a first example configuration, a vehicle safety system 10 helps protect an occupant 40 of a vehicle 20. In the example configuration of FIG. 1, the vehicle 20 includes a passenger cabin 26 in which a vehicle seat 30 is positioned, with a vehicle occupant 40 seated thereon. FIG. 1 illustrates an open configuration of the passenger cabin 26 and does not show any structure positioned in front of the occupant 40. This is because the system 10 is configured to be agnostic, at least to some extent, to the type of vehicle in which it is implemented.

Those skilled in the art appreciate that the safety system 10 can be implemented in a conventionally driven vehicle, an autonomous or driverless vehicle, or a vehicle that includes conventional drive modes, assisted drive modes, autonomous drive modes, or a combination thereof.

The vehicle seat 30 includes a base 32 connected to the vehicle 20, e.g., to the floor 22. The seat base 32 supports a seat bottom 34. A seatback 36 extends upward from the seat bottom 34 and has a reclined position that can be adjusted. A headrest 38 is positioned at an upper end of the seatback 36.

The occupant 40 is seated on the seat 30, with his/her torso 42 resting on the seatback 36, head 44 positioned at or near the headrest 38, and buttocks 46 and legs 50 (more specifically upper legs 52) resting on the seat bottom 34. The occupant's lower legs 56 extend from the knee 54 downward toward the vehicle floor 22, where the occupant's feet 58 rest. In the typical occupant position of FIG. 1, the occupant's arms 60 are at his/her side, with the upper arms 62 adjacent and parallel to the torso 42, bent at the elbows 64 with the lower arms/forearms 66 and hands 70 resting on the upper legs 52.

As shown in FIG. 1, the occupant 40 is restrained by a seatbelt 80, which is a conventional three-point restraint including a shoulder belt portion 82 that extends across the occupant's shoulder 72, and a lap belt portion 84 that extends across the occupant's lap, i.e., where the upper legs 50 meet the torso 42. The seatbelt 80 is secured via a buckle 86, which is anchored to the vehicle 20. To simplify the drawings, the seatbelt 80 is illustrated only in FIGS. 1 and 5. In the remaining figures, the seatbelt is not shown. It is, however, to be understood that, in all figures that illustrate the occupant 40 (FIGS. 1, 2, and 5-7), the occupant is restrained by a seatbelt, it just isn't shown in some of those figures. The occupant movements illustrated and described with reference to the figures are therefore those that would take place with normal use of the seatbelt 80 illustrated in FIGS. 1 and 5.

Figure 2:
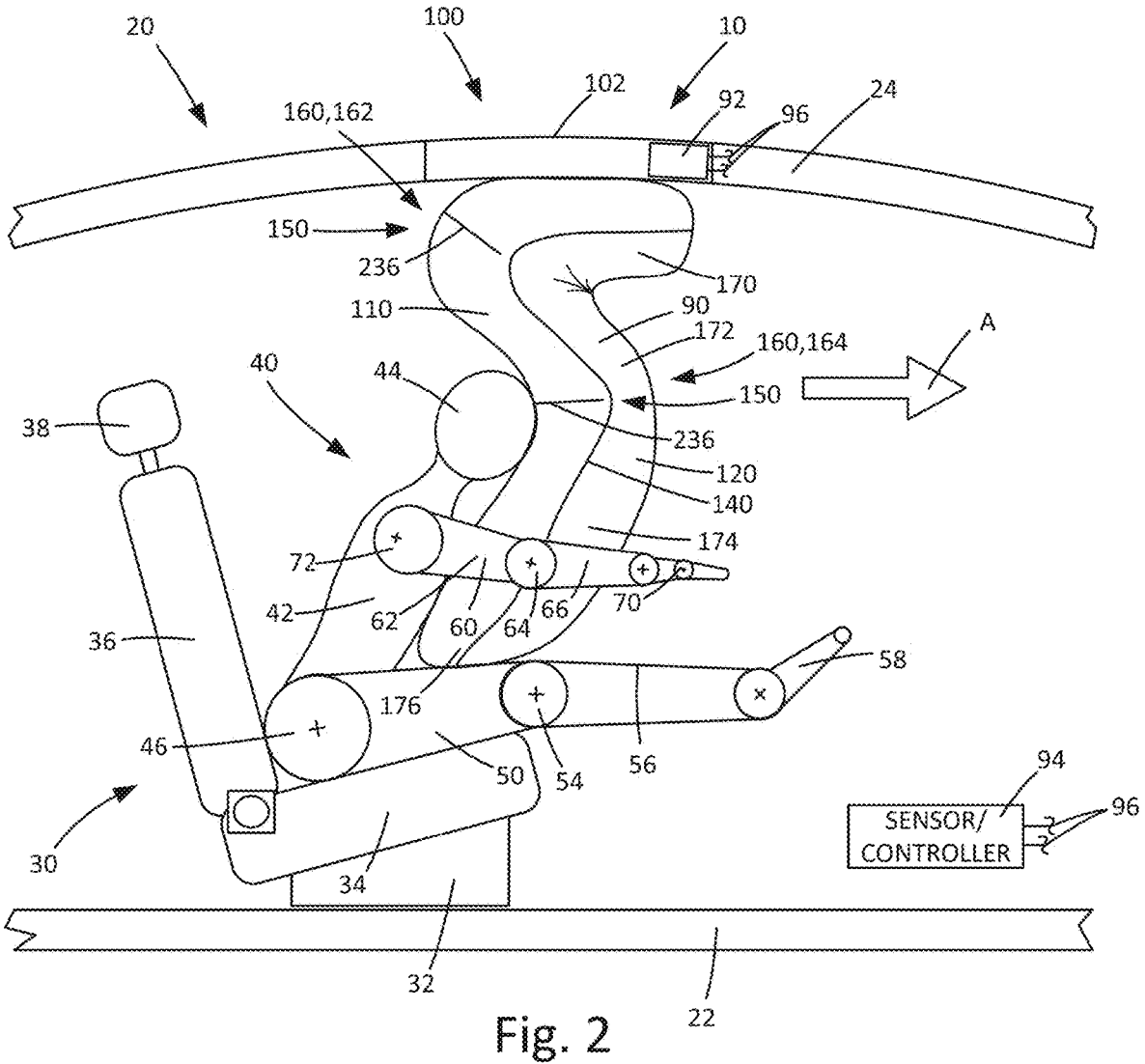
FIG. 2 is a schematic illustration of the apparatus of the apparatus of FIG. 1 receiving the occupant.

In the example configuration of FIGS. 1 and 2, the vehicle safety system 10 includes an airbag 90 mounted in a roof 24 of the vehicle 20. FIGS. 1 and 2 illustrate a vehicle 20 in which the passenger compartment 26 or cabin is without operator controls, such as a steering wheel, pedals, instrumentation, center console, etc. Accordingly, the instrument panel is reduced in size and/or removed altogether in order to maximize the space in the cabin. Control interfaces for climate controls, GPS, navigation, entertainment, etc. can, for example, be provided in a center console area of the vehicle 20 located between the passengers of the front and/or rear rows. As mentioned previously, however, the system 10 can be implemented in autonomous vehicles, semi-autonomous vehicles, or conventional operator driven vehicles.

In this open passenger cabin configuration, vehicle seats 30 can be configured, positioned, and arranged in a variety of manners, not constrained by the need to facilitate a vehicle driver/operator. For example, in FIGS. 1 and 2, the seat 30 is a forward-facing seat, facing in the direction of forward vehicle travel indicated generally by the arrow labeled A. The vehicle safety system 10 can, however, be implemented in vehicles with other seating configurations.

The airbag 90 of the safety system 10 implemented in the vehicle 20 of FIGS. 1 and 2 can be part of an airbag module 100 that includes a housing 102 for supporting the airbag along with an inflator 92 that is actuatable to provide inflation fluid for inflating and deploying the airbag. As shown in FIGS. 1 and 2, the safety system 10 also includes a sensor/controller 94 configured to sense the occurrence of an event for which occupant protection is desired, such as a collision. In response to sensing the event, the sensor/controller 94 is operative to provide a signal for actuating the inflator 92, e.g., via lead wires 96.

When actuated, the airbag 90 deploys downward from the vehicle roof 24 in front of the occupant 40. FIG. 1 illustrates the airbag 90 in a deflated and stored condition prior to deployment in dashed lines. FIG. 1 also illustrates the airbag 90 in an inflated and deployed condition (solid lines) prior to the occupant 40 impacting the bag. FIG. 2 illustrates the airbag 90 in an inflated and deployed condition with the occupant 40 impacting the bag.

Figure 3A:
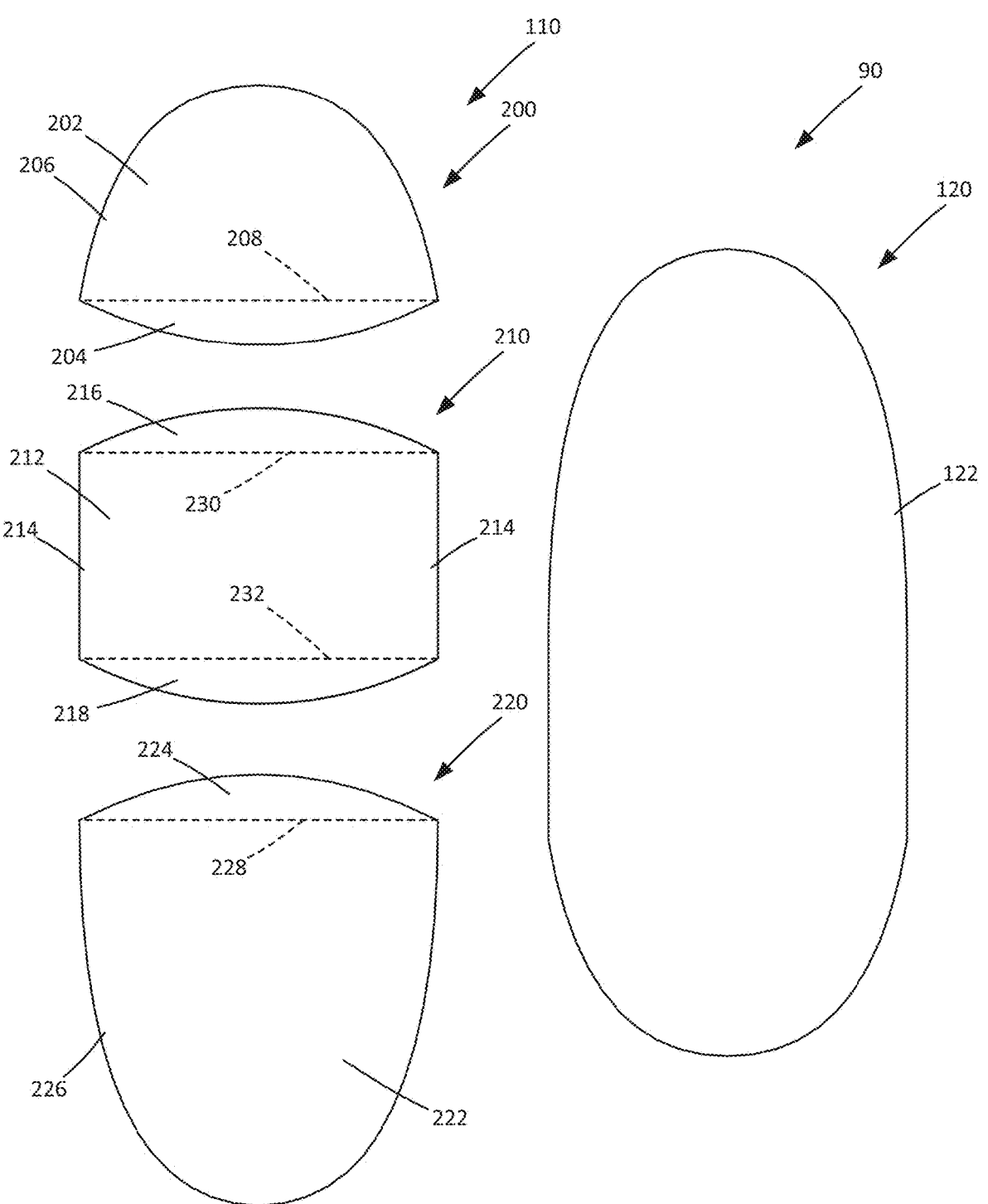
FIGS. 3A-3F are perspective views illustrating construction of the apparatus, according to the first example configuration.

The airbag 90 can have a variety of constructions. One example construction is illustrated in FIGS. 3A-3F. FIG. 3A shows the airbag 90 in an exploded condition that illustrates the components and how they are assembled to produce the airbag. In the example configuration of FIGS. 3A-3E, the airbag 90 has a two-panel construction, with the primary components that are assembled to form the airbag 90 including a first panel 110 and a second panel 120. Each panel 110, 120 has a length (measured along the long dimension of the airbag 90 as shown in FIG. 3E) and a width (measured along the short dimension of the airbag 90 as shown in FIG. 3E). The first panel 110 has a multi-piece construction in which the components are assembled to form the first panel, which is then connected to the second panel 120. The panels 110, 120 are positioned overlying each other and interconnected about their respective peripheries 112, 122 to define a confinement, i.e., an inflatable volume, of the airbag 90.

In this description, the terms used to describe how the various panels and other components of the airbag 90 are interconnected, such as "connections," is meant generally to encompass the variety of manners in which the interconnections can be achieved. For example, the connections can be stitching that interconnects the panels/components of the airbag 90. As another example, the connections can be laser or ultrasonic welding that interconnects the panels/components of the airbag 90. As another example, the connections can be an adhesive bond that interconnects the panels/components of the airbag 90. As a further example, the airbag 90 or components thereof can have a one-piece woven (OPW) construction in which panels or components are woven simultaneously and interwoven with each other to form the connections. Additionally, the airbag 90 can include connections formed in more than one of these manners.

Connections forming internal tethers can interconnect the panels 110, 120 within the periphery of the airbag 90. The lines indicated at 130 in FIG. 3E indicate example locations for connections forming the internal tethers. As shown, these tethers 130 can extend longitudinally, i.e., along the length of the bag. In the example configuration illustrated in FIGS. 3A-3E, the internal tethers 130 extend longitudinally in segments that intermittently interconnect the panels 110, 120 along the length of the airbag 90. In this example configuration, two sets of longitudinally extending internal tethers 130 include multiple segments that divide the inflatable volume of the airbag 90 into longitudinally extending chambers 132. In the example configuration of FIGS. 3A and 3B, the two sets of internal tethers 130 define three chambers 132 across the width of the airbag 90.

Figure 3B:
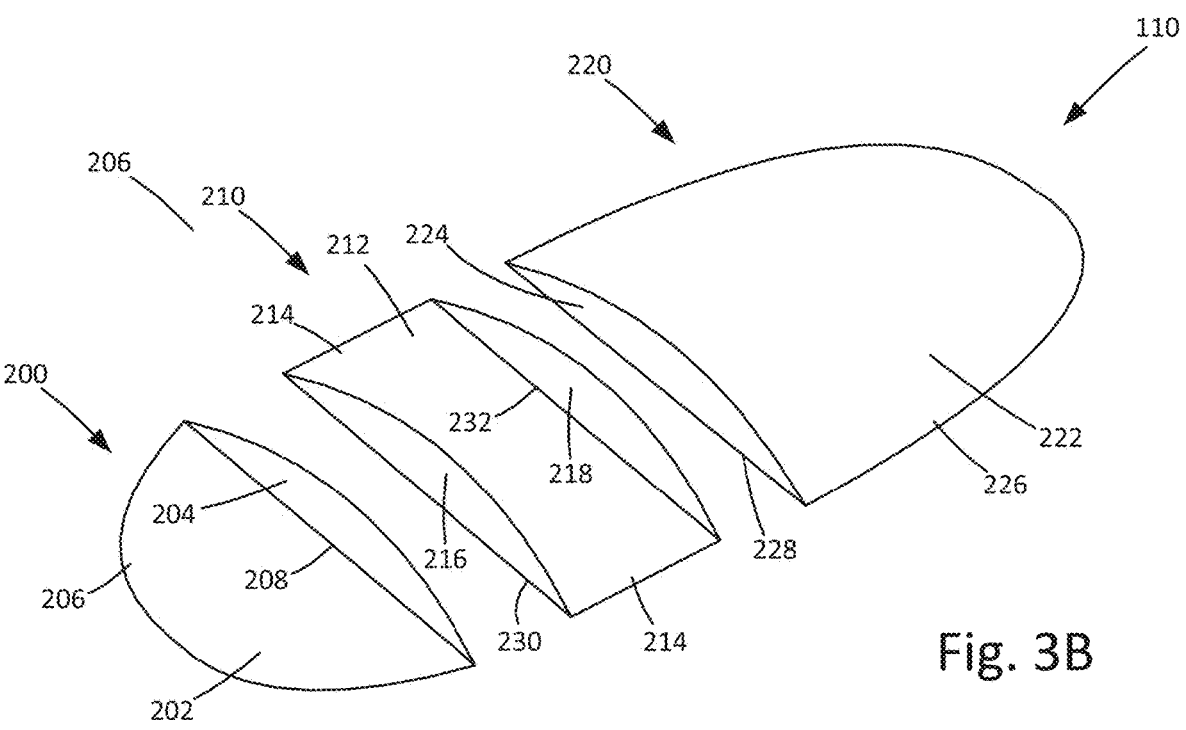

The configuration of the internal tethers 130 could differ from that illustrated in the example configuration of FIGS. 3A and 3B. For example, the number of internal tethers 130 spaced widthwise across the airbag 90 could be greater or fewer than two, creating greater or fewer than three longitudinally extending chambers 132. In fact, the airbag 90 could be free from internal tethers, in which case the airbag would include a single contiguous chamber. Moreover, although the internal tethers 130 are illustrated as extending linearly, the internal tethers could extend in a curved manner or in combinations of linear and curved. Additionally, instead of extending in the same, uniform direction, the internal tethers 130 could extend in different directions. Furthermore, the internal tethers 130 need not be uniform in depth. The depths of the internal tethers 130 can vary, providing a variable airbag 90 thickness, i.e., thicker in some areas and thinner in others.

The internal tethers 130 can be in the form of connections that interconnect the panels 110, 120 directly. Alternatively, the internal tethers 130 can be formed of a separate tether, e.g., an elongated strip of material, with connections that connect one edge of the strip to the first panel 110 and an opposite edge of the strip to the second panel 120. These connections can be formed in any of the manners described herein, such as stitching, welding, adhesive bonding, OPW, etc.

As shown in FIG. 3E, the airbag 90 can have a simple construction in which the panels 110, 120 are interconnected at a peripheral connection 140 that extends along their respective peripheries 112, 122 to define an inflatable volume of the airbag. This inflatable volume can be divided into the chambers 132 by the tethers 130. Regardless, the airbag construction can be a simple, two piece construction formed by overlying panels that are interconnected to define the inflatable volume. The tethers 130 control the thickness so that the airbag 90, absent additional features, would have a configuration that is generally flat, rectangular, and somewhat uniform in thickness, with slight variations in the thickness due to the configurations of the tethers 130 and/or chambers 132.

The airbag 90 also includes pleats 150 that help control the shape of the airbag by causing the formation of bending regions, referred to herein as bends 160, that cause what would otherwise be a generally flat airbag to take on a shaped configuration. According to the first example configuration, the bends 160 help shape the airbag 90 so that it can be mounted in the vehicle roof 24 and deploy/function in the manner described below to help protect the occupant 40 of a vehicle seat 30 positioned below.

The configuration and arrangement of the pleats 150 dictates how the bends 160 are formed in the airbag 90. The pleats 150 cause the bends 160 in the airbag 90 to form with a convex surface of the bend located on the panel in which the pleat is formed. Thus, in the example configuration of FIGS. 1-3F, the bends 160 takes on a generally C-shaped curved configuration due to the pleats both being formed in the first panel 110. From this, it will be appreciated that pleats formed in the second panel 120 would cause the formation of bends that bend the airbag in the opposite direction. These could be implemented, for example, to produce an S-shape of Z-shape bend configuration of the airbag 90.

As shown in FIGS. 1 and 2, the bends 160 include a first or upper bend 162 and a second or lower bend 164. The bends 160 divide the airbag 90 into an upper portion 170, a middle portion 172, and a lower portion 174. As shown, the upper bend 162 allows the upper portion 170 to extend along the roof 24/module housing 102 and the middle portion 172 to extend at an angle downward from the roof toward the occupant 40. The lower bend 164 is positioned at or about the level of the occupant's head 44 and is configured so that the lower portion 174 extends from the lower bend 164 in a generally vertical direction along the occupant's torso 42, terminating adjacent to the upper legs 52.

In the example configuration of FIGS. 1-3F, the first panel 110 includes the pleats 150. The first panel 110 has a three-piece construction that is configured to form the pleats 150. This is shown in FIG. 3A. As shown in FIG. 3A, the first panel 110 includes a first piece 200, a second piece 210, and a third piece 220. The first piece 200 corresponds to the upper portion 170 of the airbag 90; second piece 210 corresponds to the middle portion 172 of the airbag 90; and third piece 220 corresponds to the lower portion 174 of the airbag 90.

The first piece 200 includes a main portion 202 and an end portion 204. The main portion 202 has a periphery 206 with a curved configuration that defines a portion of the periphery 112 of the first panel 110 along the upper portion of the airbag 90. The end portion 204 defines a portion of the pleat 150 between the upper portion 170 and the middle portion 172 of the airbag 90.

The second piece 210 includes a main portion 212 with opposite lateral edge portions 214, a first end portion 216, and a second end portion 218, opposite the first end portion. The lateral edge portions 214 define opposite edges of the middle portion 170 of the airbag 90 and the portions of the periphery 112 that correspond to the middle portion. The first end portion 216 defines a portion of the pleat 150 between the upper portion 170 and the middle portion 172 of the airbag 90. The second end portion 218 defines a portion of the pleat 150 between the middle portion 172 and the lower portion 174 of the airbag 90.

The third piece 220 includes a main portion 222 and an end portion 224. The main portion 222 has a periphery 226 with a curved configuration that defines a portion of the periphery 112 of the first panel 110 along the lower portion 174 of the airbag 90. The end portion 224 defines a portion of the pleat 150 between the middle portion 172 and the lower portion 174 of the airbag 90.

Figure 3C:
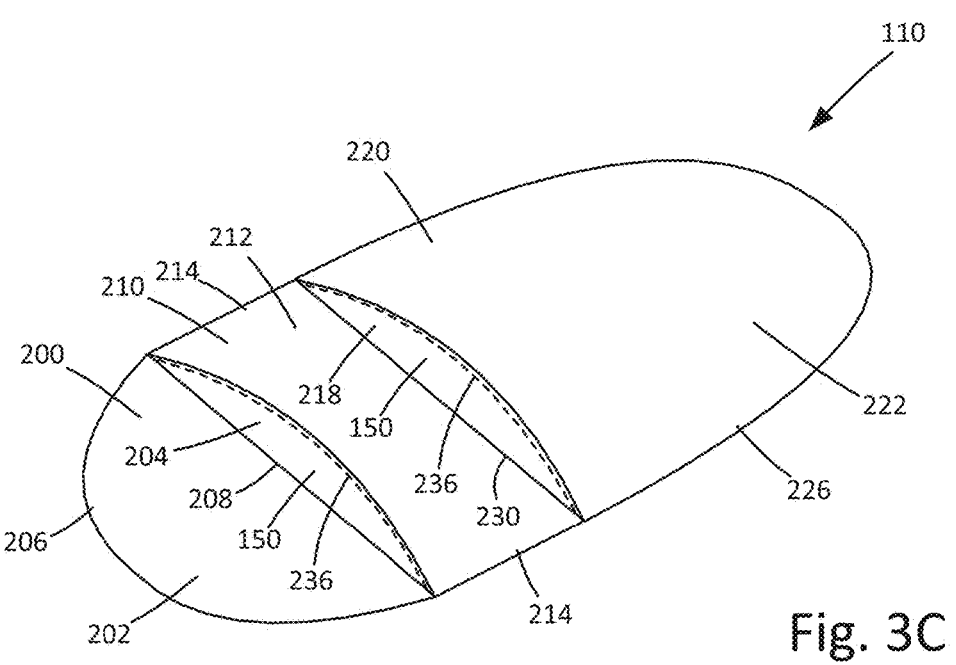

Referring to FIGS. 3B and 3C, the first, second, and third pieces 200, 210, 220 are interconnected to form the first panel 110. To do so, the end portions of the pieces are folded along respective fold lines, as shown in FIG. 3B. Specifically, the end portion 204 of the first piece 200 is folded along fold line 208. The end portions 216 and 218 of the second piece 210 are folded along respective fold lines 230, 232. The end portion 224 of the third piece 220 is folded along fold line 228. This positions the end portions 204, 216, 218, 224 extending upward from their respective main portions 202, 212, 222, as shown in FIG. 3B. The panels 200, 210, 220 are moved together so that the upward folded end portions 204, 216, 218, 224 are positioned adjacent each other. Overlying pairs of the end portions, i.e., 204 & 216 and 218 & 224 are interconnected via connections 236, thereby connecting the pieces 200, 210, 220 to each other and forming the first panel 110. This is shown in detail in FIG. 3F, which illustrates formation of the pleat 150 between the upper portion 170 and the middle portion 172.

Figure 3D:
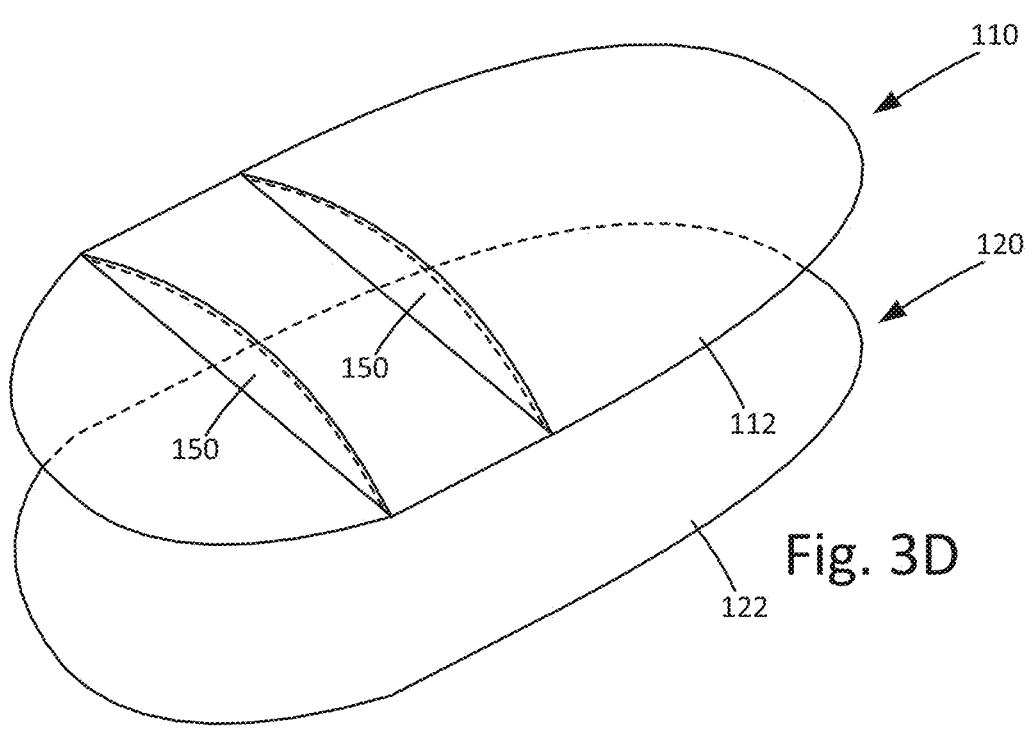
Figure 3E:
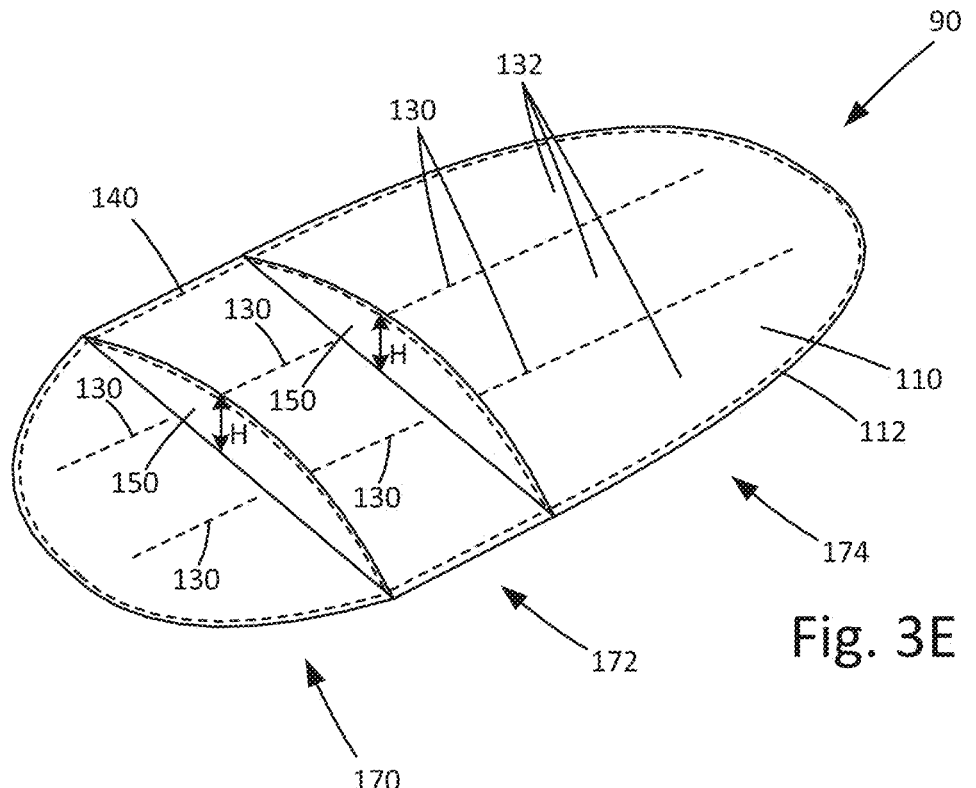
Figure 3F:
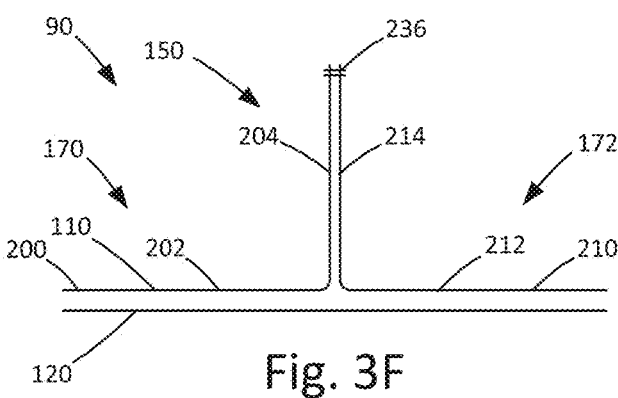

Referring to FIG. 3D, the first and second panels 110, 120 are positioned overlying each other with their respective peripheries 112, 122 in alignment with each other. In this arrangement, the first panel 110 is positioned so that the pleats 150 extend upward, as shown. The panels 110, 120 are brought together and interconnected about their respective peripheries 112, 122 by a perimeter connection 140.

The side of the airbag 90 on which the pleats 150 are formed determines the directions of the bends 160 created by the pleats. More specifically, induced by the pleats 150, the bends 160 will be convex on the surface of the panel in which the pleats are formed, and concave on the surface of the panel opposite the panel in which the pleats are formed. Thus, in the example configuration of FIGS. 1 and 2, the bends 160 are convex on the first panel 110, which faces the occupant 40, and concave on the second panel 120, which faces away from the occupant. The pleats 150 on the airbag 90 are thus formed on the first panel 110, as shown in FIGS. 3A-3E.

The degree of bending produced in the airbag 90 by the pleats 150 depends on the configurations of the pieces 200, 210, 220 which form the first panel 110. For purposes of this description, we refer to the height of the pleats 150, which is measured from the fold lines to the edge of the associated end portion at its highest point or apex, as viewed in FIG. 3E. Referring to FIG. 3E, the height of the pleats 150 is indicated generally at H. The greater the height H, the greater the degree of bending, and vice versa. Thus, the pleat 150 forming the upper bend 162 can have a height H that is smaller than the height H of the pleat forming the lower bend 164. As a result, the lower bend 164 can be configured to produce an angle C (see FIG. 1) between the middle portion 172 and lower portion 174 that is greater than the angle D (see FIG. 1) between the upper portion 170 and middle portion 172.

Figure 4A:
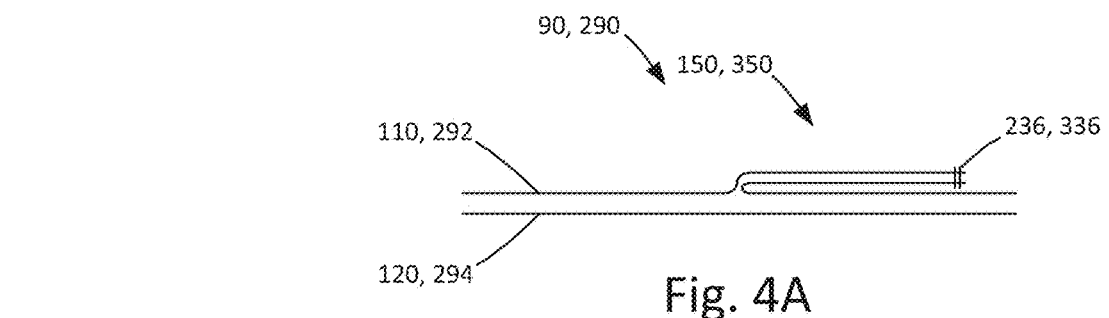
FIGS. 4A-4C are schematic views detailing a portion of the apparatus in different folded configurations.
Figure 4B:
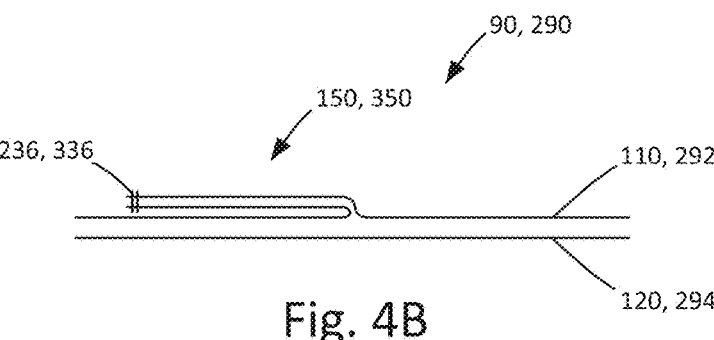
Figure 4C:
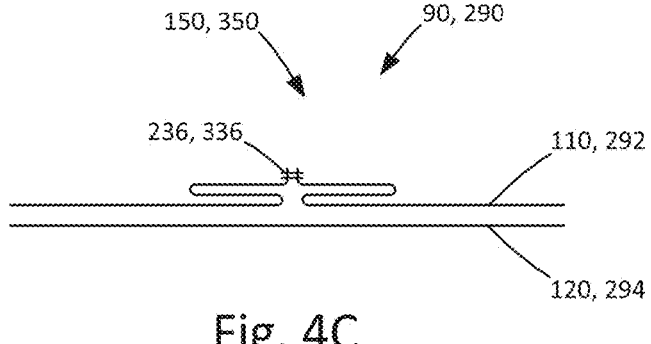

The formation of the pleats 150 allows for a simple construction of the airbag 90 with the bend configuration illustrated in the figures. The pleats 150 produce the bends 160 and the resulting shaped airbag 90 without significantly affecting the folding and storage of the airbag. As shown in FIGS. 4A-4C, the pleats 150 can be folded for placement in the stored condition in a variety of manners. As shown in FIGS. 4A and 4B, the pleats 150 can folded as a whole to the right or left as viewed in the figures to a position overlying the adjacent airbag portion. In this condition, the pleat 150 lies flat against the remainder of the airbag 90. The airbag 90 can therefore be folded and/or rolled easily and placed in the stored condition. As shown in FIG. 4C, the pleat 150 can be pressed against the remainder of the airbag 90, leaving the connection 236 centered on the flattened pleat. The airbag 90 can therefore be folded and/or rolled easily and placed in the stored condition.

In the example configuration of the airbag 90 shown in FIGS. 1 and 2, the airbag 90 is shaped by the pleats 150 to form the bends 160, which are configured to position the airbag 90 extending in front of the occupant, with the bend 164 positioned in front of the occupant's head 44. The middle portion 172 of the airbag 90 extends down to and covers a portion of the occupant's head 44. The lower portion 174 of the airbag can also cover a portion of the occupant's head 44 and extends downward, covering the occupant's torso 42, and terminating at the occupant's upper legs 52.

The bend 164 between the middle portion 172 and the lower portion 174 is positioned with the bend facing convexly toward the occupant's head 44. Of course, this positioning of the airbag 90 relative to the occupant 40 will vary depending on the size of the occupant and the seating position of the occupant. The airbag 90 can therefore be configured to assume the illustrated inflated and deployed position for an occupant having a physiology selected according to statistics that place that person within certain segments of the population.

In development and testing of vehicle safety systems, manufacturers and safety authorities rely on statistical models and data to help quantify performance criteria and measure system performance. In doing so, reference is made to statistical vehicle occupants that represent the physical characteristics of vehicle occupants for which vehicle safety systems are meant to protect. These statistical occupants include a 50th percentile male occupant (50% male), a 95th percentile male occupant (95% male), and a 5th percentile female occupant (5% female).

The 50% male is derived from statistical values for the U.S. male population. The 50% male has the mean height and weight of the male U.S. population, meaning that roughly half of the U.S. male population is taller/heavier and roughly half of the U.S. male population is shorter/lighter. The 50% male is thus an average or medium sized male occupant.

The 95% male is derived from statistical values for the U.S. male population. The 95% male has a mean height and weight that is taller/heavier than roughly 95% of the male U.S. population, meaning that only roughly 5% of the U.S. male population is taller/heavier and roughly 95% of the U.S. male population is shorter/lighter. The 95% male is thus a large sized male occupant.

The 5% female is derived from statistical values for the U.S. female population. The 5% female has a mean height and weight that is taller/heavier than only roughly 5% of the U.S. female population. Conversely, this means that roughly 95% U.S. female population is taller/heavier than the 95% female. The 5% female is thus a small female occupant.

The airbag 90 can, for example, be configured to accommodate the physiology of an occupant 40 sized according to National Highway Transportation Safety Administration (NHTSA) guidelines, such as a $50^{th}$ percentile male occupant, a $95^{th}$ percentile male occupant, or a 5th percentile female.

The curved configuration of the airbag 90 resulting from the bends 160 formed by the pleats 150 produces a desired positioning of the airbag relative to the occupant 40 and also shapes the airbag. Due to this positioning and shaping, the surface of the airbag 90 presented facing the occupant 40, i.e., the first panel 110, is contoured so as to receive the occupant in a desired manner. The bend 162 controls the trajectory or direction at which the middle and lower portions 172, 174 deploy toward the occupant 40, as well as their final positions relative to the occupant once the airbag 90 is inflated. The bend 164 controls the curved/bent shape of the middle and lower portions 172, 174, as well as the position of the bend on the airbag 90. Together, the bends 162, 164 produced by the pleats 150 are configured to position the airbag 90 and the location of the bend 164 relative to the occupant 40, as shown in FIG. 1.

The bend 164 between middle and lower portions 172, 174 of the airbag 90 is advantageous because it allows for using the roof 24 as a reaction surface for supporting the airbag against the forces of impact and penetration when receiving the occupant 40. When the occupant 40, restrained by the seatbelt 80, leans or bends forward in response to a vehicle collision (see FIG. 2), the lower portion 174 of airbag 90 receives the forward-moving occupant 40 and conforms to the occupant, cushioning the occupant and providing a desired ride-down effect. Because the terminal lower end 176 of the lower portion 174 is positioned in the lap/hip region of the occupant 40, the lower end of the airbag is received between the upper legs 50 and torso 42 with the forward bending of the occupant about the waist causing the lower end 176 to be "pinched" or "grasped" between the torso 42 and the upper legs 52. This prevents the airbag 90 from simply moving forward in response to the impacting occupant. The airbag 90 is thus anchored to the roof 24 via attachment to the airbag module 100 at the upper end, and anchored to the seat 30 by the belted occupant 40 at the lower end. Because of this, the roof 24 becomes a reaction surface for the airbag 90. As a result, movement and penetration of the upper torso 42 and head 44 into the airbag 90 tends to straighten or un-bend the bend 164, with the roof 24 supporting the airbag 90 and allowing the airbag to absorb the occupant impact forces.

Figure 5A:
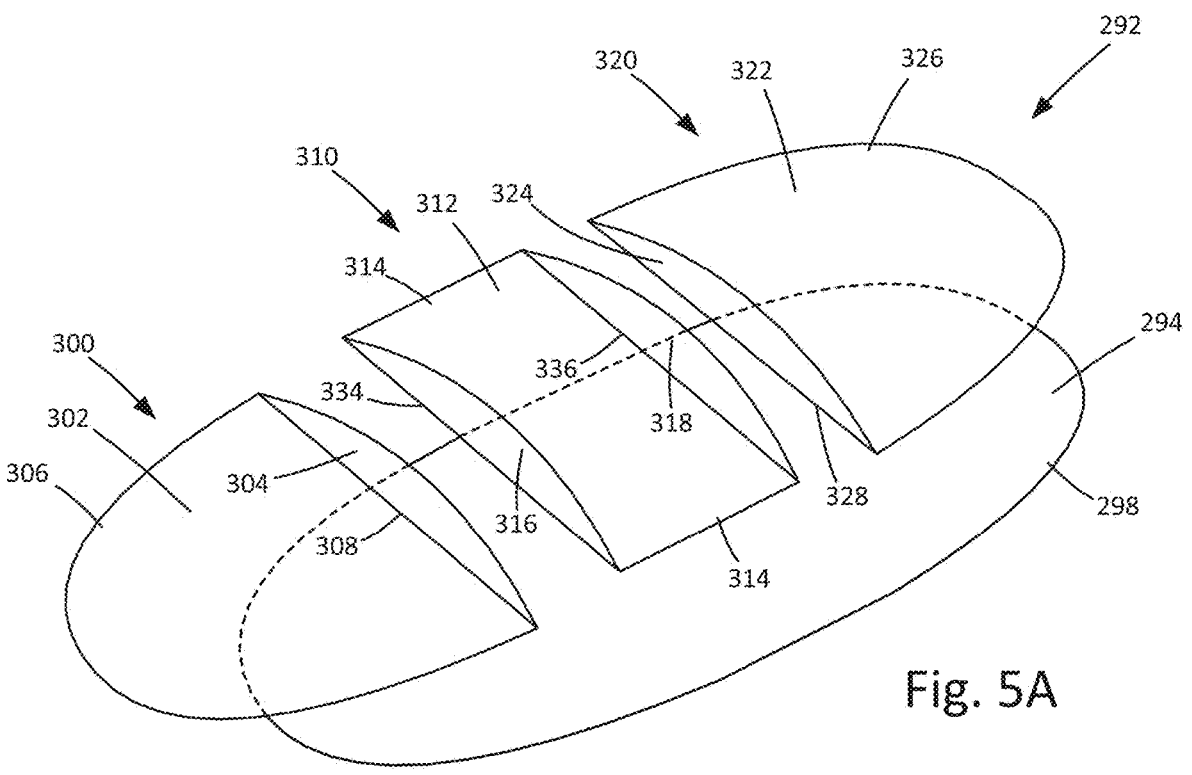
FIGS. 5A-5D are schematic illustrations of the apparatus according to a second example configuration.
Figure 5B:
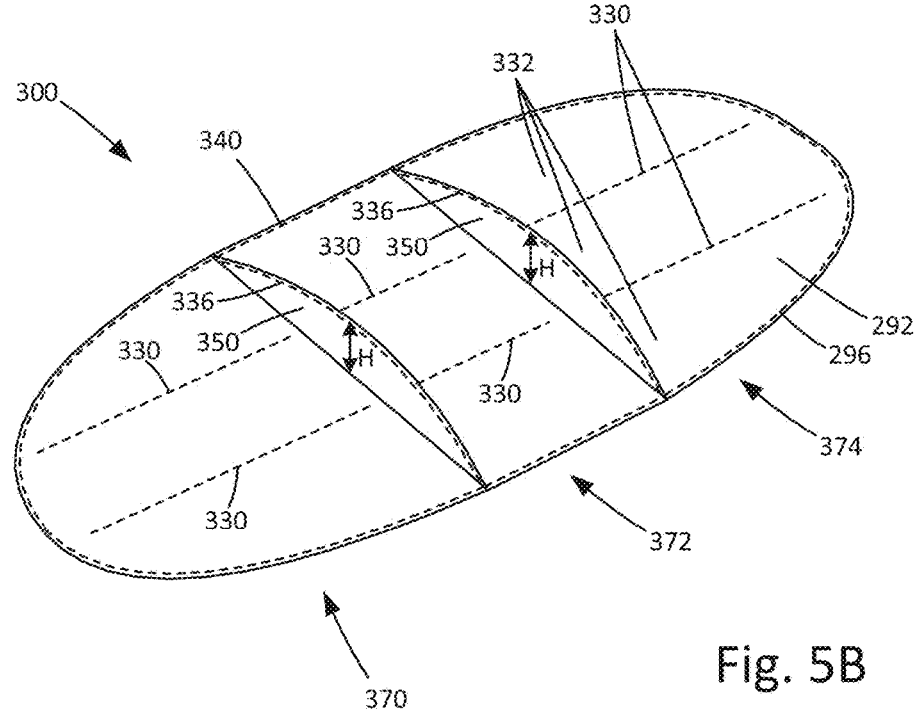
Figures 5C, 5D:
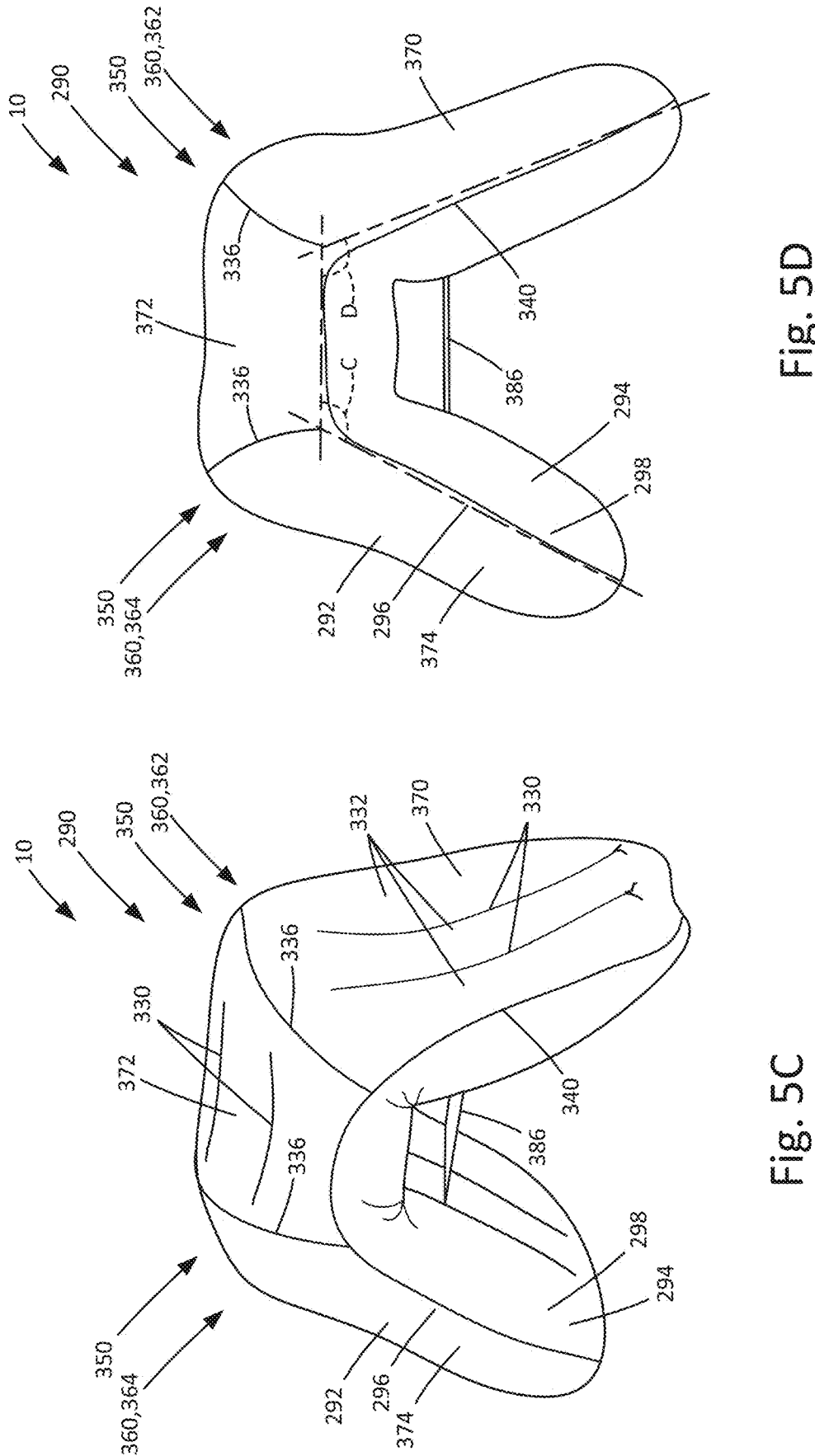

Another example configuration of the vehicle safety system 10 is shown in FIGS. 5A-5D. According to this configuration, the system 10 includes an airbag 290 that has a two-panel construction, with the primary components that are assembled to form the airbag 290 including a first panel 292 and a second panel 294. Each panel 292, 294 has a length (long dimension as shown in FIG. 5B) and a width (short dimension as shown in FIG. 5B). The panels 292, 294 are positioned overlying each other and interconnected about their respective peripheries 296, 298 to define a confinement, i.e., an inflatable volume, of the airbag 290.

In this description, the terms used to describe how the various panels and other components of the airbag 290 are interconnected, such as "connections," is meant generally to encompass the variety of manners in which the interconnections can be achieved. For example, the connections can be stitching that interconnects the panels/components of the airbag 290. As another example, the connections can be laser or ultrasonic welding that interconnects the panels/components of the airbag 290. As another example, the connections can be an adhesive bond that interconnects the panels/components of the airbag 290. As a further example, the airbag 290 or components thereof can have a one-piece woven (OPW) construction in which panels or components are woven simultaneously and interwoven with each other to form the connections. Additionally, the airbag 290 can include connections formed in more than one of these manners.

Connections forming internal tethers can interconnect the panels 292, 294 within the periphery of the airbag 290. The lines indicated at 330 indicate example locations for connections forming internal tethers. As shown, these tethers 330 can extend longitudinally, i.e., along the length of the bag. In the example configuration illustrated in FIGS. 5A-5D, the internal tethers 330 extend longitudinally in segments that intermittently interconnect the panels 292, 294 along the length of the airbag 290. In this example configuration, two sets of longitudinally extending internal tethers 330 include multiple segments that divide the inflatable volume of the airbag 290 into longitudinally extending chambers 332. In the example configuration of FIGS. 5A-5D, the two sets of internal tethers 330 define three chambers 332 across the width of the airbag 290.

The configuration of the internal tethers 330 could differ from that illustrated in the example configuration of FIGS. 5A-5D. For example, the number of internal tethers 330 spaced widthwise across the airbag 290 could be greater or fewer than two, creating greater or fewer than three longitudinally extending chambers 332. In fact, the airbag 290 could be free from internal tethers, in which case the airbag would include a single contiguous chamber. Moreover, although the internal tethers 330 are illustrated as extending linearly, the internal tethers could extend in a curved manner or in combinations of linear and curved. Additionally, instead of extending in the same, uniform direction, the internal tethers 330 could extend in different directions. Furthermore, the internal tethers 330 need not be uniform in depth. The depths of the internal tethers 330 can vary, providing a variable airbag 290 thickness, i.e., thicker in some areas and thinner in others.

The internal tethers 330 can be in the form of connections that interconnect the panels 292, 294 directly. Alternatively, the internal tethers 330 can be formed of a separate tether, e.g., an elongated strip of material, with connections that connect one edge of the strip to the top/first panel 292 and an opposite edge of the strip to the bottom/second panel 294. These connections can be formed in any of the manners described herein, such as stitching, welding, adhesive bonding, OPW, etc.

As shown in FIGS. 5A-5D, the airbag 290 can have a simple construction in which the panels 292, 294 are interconnected at a peripheral connection 340 that extends along their respective peripheries 296, 298 to define an inflatable volume of the airbag. This inflatable volume can be divided into the chambers 332 by the tethers 330. Regardless, the airbag construction can be a simple, two piece construction formed by overlying panels that are interconnected to define the inflatable volume. The tethers 330 control the thickness so that the airbag 290, absent additional features, would have a configuration that is generally flat, rectangular, and somewhat uniform in thickness, with slight variations in the thickness due to the configurations of the tethers 330 and/or chambers 332.

The airbag 290 also includes pleats 350 that help control the shape of the airbag by causing the formation of bending regions, referred to herein as bends 360, that cause what would otherwise be a generally flat airbag to take on a shaped configuration. According to the second example configuration, the bends 360 help shape the airbag 290 so that it can be mounted in a mounting structure positioned in front of the seat for which the airbag is intended to provide protection of the occupant 40. In the second example configuration, this structure is the seatback 36 of a seat 30 positioned in front of the seat in which the occupant 40 is seated (see FIG. 6). Mounted as such, the airbag 290 is configured to deploy/function in the manner described below to help protect the occupant 40.

As shown in FIGS. 5A-5D, the bends 360 include a first or front bend 362 and a second or rear bend 364. The bends 160 divide the airbag 290 into a front portion 370, a middle portion 372, and a rear portion 374. As shown in FIG. 5, the front bend 362 allows the front portion 370 to extend along a generally vertical mounting structure, such as a vehicle seatback 36 (see FIG. 5). The middle portion 372 extends rearward from the front bend 362, generally horizontally to the rear bend 364. The rear bend 364 is thus positioned rearward of the front bend 362 and is positioned at or about the level of the occupant's head 44. The rear portion 374 extends from the rear bend 364 in a generally vertical direction downward along the occupant's torso 42, terminating adjacent to the upper legs 52.

In the example configuration of FIGS. 5A-5D, the first panel 292 includes the pleats 350. The first panel 292 has a three-piece construction that is configured to form the pleats 350. This is shown in FIG. 5A. As shown in FIG. 5A, the first panel 292 includes a first piece 300, a second piece 310, and a third piece 320. The first piece 300 corresponds to the front portion 370 of the airbag 290, the second piece 310 corresponds to the middle portion 372 of the airbag 290, and the third piece 320 corresponds to the rear portion 374 of the airbag 290.

The first piece 300 includes a main portion 302 and an end portion 304. The main portion 302 has a periphery 306 with a curved configuration that defines a portion of the periphery 296 of the first panel 292 extending along front portion 370 of the airbag 290. The end portion 304 defines a portion of the pleat 350 between the front portion 370 and the middle portion 372 of the airbag 290.

The second piece 310 includes a main portion 312 with opposite lateral edge portions 314, a first end portion 316, and a second end portion 318, opposite the first end portion. The lateral edge portions 314 define opposite edges of the middle portion 370 of the airbag 290 and the portions of the periphery 296 that corresponds to the middle portion. The first end portion 316 defines a portion of the pleat 350 between the front portion 370 and the middle portion 372 of the airbag 290. The second end portion 318 defines a portion of the pleat 350 between the middle portion 372 and the rear portion 374 of the airbag 290.

The third piece 320 includes a main portion 322 and an end portion 324. The main portion 322 has a periphery 326 with a curved configuration that defines a portion of the periphery 296 of the first panel 292 extending along the rear portion 374 of the airbag 290. The end portion 324 corresponds to the rear portion 374 of the airbag 290. The end portion 324 defines a portion of the pleat 350 between the middle portion 372 and the rear portion 374 of the airbag 290.

Referring to FIG. 5B, the first, second, and third pieces 300, 310, 320 are interconnected to define the first panel 292. To do so, the end portions of the pieces are folded along respective fold lines, as shown in FIG. 5A. Specifically, the end portion 304 of the first piece 300 is folded along fold line 308. The end portions 316 and 318 of the second piece 310 are folded along respective fold lines 334, 336. The end portion 324 of the third piece 320 is folded along fold line 328. This positions the end portions 304, 314, 316, 324 extending upward from their respective main portions 302, 312, 322, as shown in FIG. 5A. The pieces 300, 310, 320 are moved together so that the upward folded end portions 304, 316, 318, 324 are positioned adjacent each other. Overlying pairs of the end portions 304, 316, 318, 324 are interconnected via connections 336, thereby connecting the pieces 300, 310, 320 to each other and forming the first panel 292. This is shown in detail in FIG. 5B, which illustrates formation of the pleat 350 between the front portion 370 and the middle portion 372, and the pleat 350 between the middle portion 372 and the rear portion.

Referring to FIG. 5B, the first and second panels 292, 294 are positioned overlying each other with their respective peripheries 296, 298 in alignment with each other. In this arrangement, the first panel 292 is positioned so that the pleats 350 extend upward, as shown. The panels 292, 294 are brought together and interconnected about their respective peripheries 296, 298 by a perimeter connection 340.

The side of the airbag 290 on which the pleats 350 are formed determines the directions of the bends 360 created by the pleats. More specifically, induced by the pleats 350, the bends 360 will be convex on the surface of the panel in which the pleats are formed, and concave on the surface of the panel opposite the panel in which the pleats are formed. Thus, in the example configuration of FIGS. 5A-5D, the bends 360 are convex on the first panel 292, which faces the occupant 40, and concave on the second panel 294, which faces away from the occupant. The pleats 350 on the airbag 290 are thus formed on the first panel 292, as shown in FIGS. 5A-5D.

The degree of bending produced in the airbag 290 by the pleats 350 depends on the configurations of the pieces 300, 310, 320 which form the first panel 292. For purposes of this description, we refer to the height of the pleats 350, which is measured from the fold lines to the edge of the associated end portion at its highest point. Referring to FIG. 5B, the height of the pleats 350 is indicated generally at H. The greater the height H, the greater the degree of bending, and vice versa. Thus, the pleat 350 forming the front bend 362 can have a height H that is smaller than the height H of the pleat forming the rear bend 364. As a result, the rear bend 364 can be configured to produce an angle C between the middle portion 372 and rear portion 374 that is greater than the angle D between the front portion 370 and middle portion 372.

The formation of the pleats 350 allows for a simple construction of the airbag 290 with the bend configuration illustrated in the figures. The pleats 350 produce the bends 360 and the resulting shaped airbag 290 without significantly affecting the folding and storage of the airbag. As shown in FIGS. 4A-4C, the pleats 350 can be folded for placement in the stored condition in a variety of manners. As shown in FIGS. 4A and 4B, the pleats 350 can folded as a whole to the right or left as viewed in the figures to a position overlying the adjacent airbag portion. In this condition, the pleat 350 lies flat against the remainder of the airbag 290. The airbag 290 can therefore be folded and/or rolled easily and placed in the stored condition. As shown in FIG. 4C, the pleat 350 can be pressed against the remainder of the airbag 290, leaving the connection 336 centered on the flattened pleat. The airbag 290 can therefore be folded and/or rolled easily and placed in the stored condition.

To enforce or ensure that the airbag 290 takes the desired curvature and shape, one or more external tethers 386 can be used to interconnect the airbag portions 370, 372, 374. The tethers 386 can, for example, enforce the desired angles C and D between the respective airbag portions. In the example configuration illustrated in FIGS. 5A-5C, the external tether 386 interconnects the front and rear portions 370, 374. External tether(s) could, however, interconnect the front and middle portions 370, 372, or the middle and rear portions 372, 374.

Figure 6:
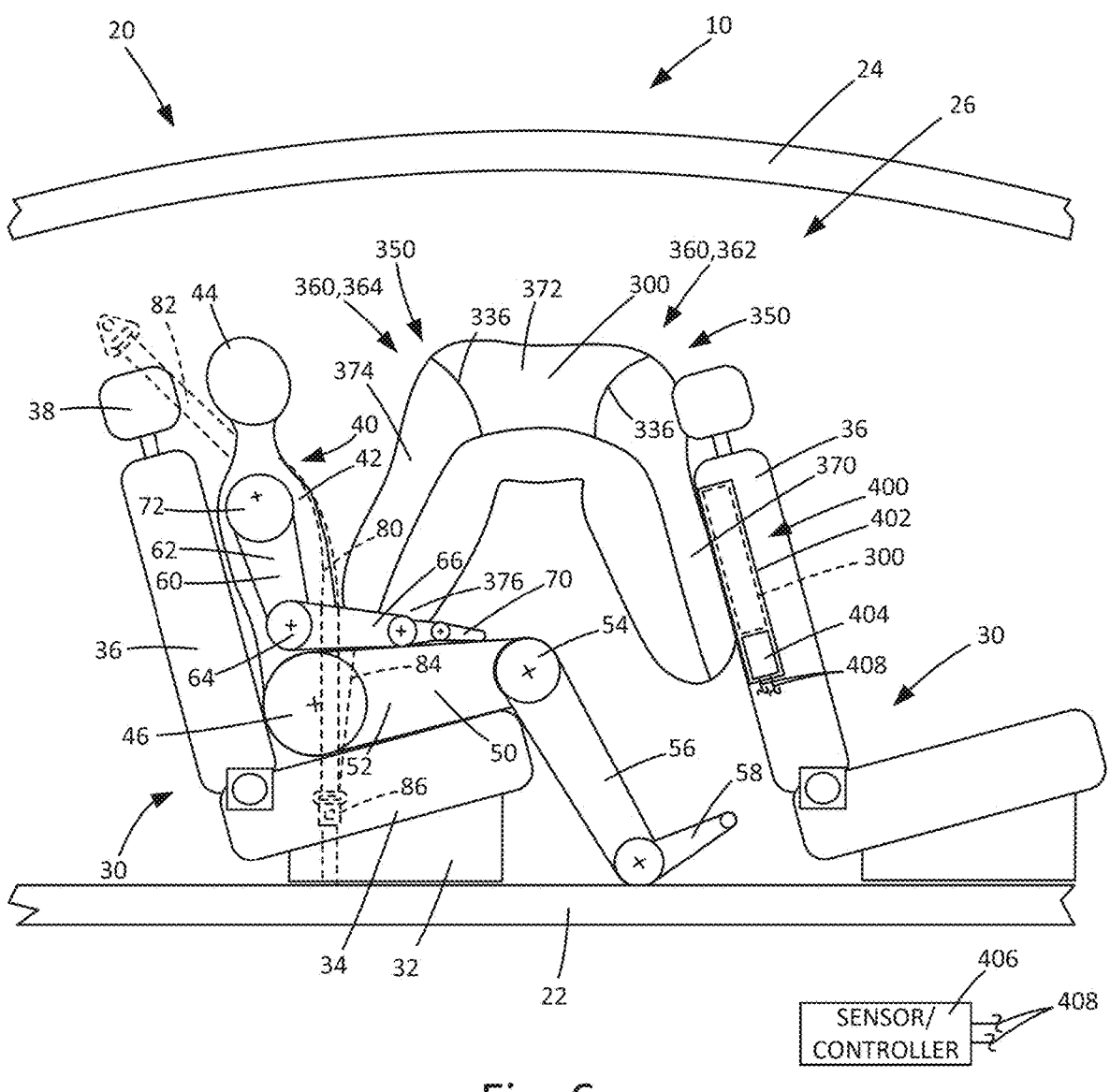
FIG. 6 is a side view illustrating the apparatus of FIGS. 5A-5D in a deployed condition prior to receiving the occupant.
Figure 7:
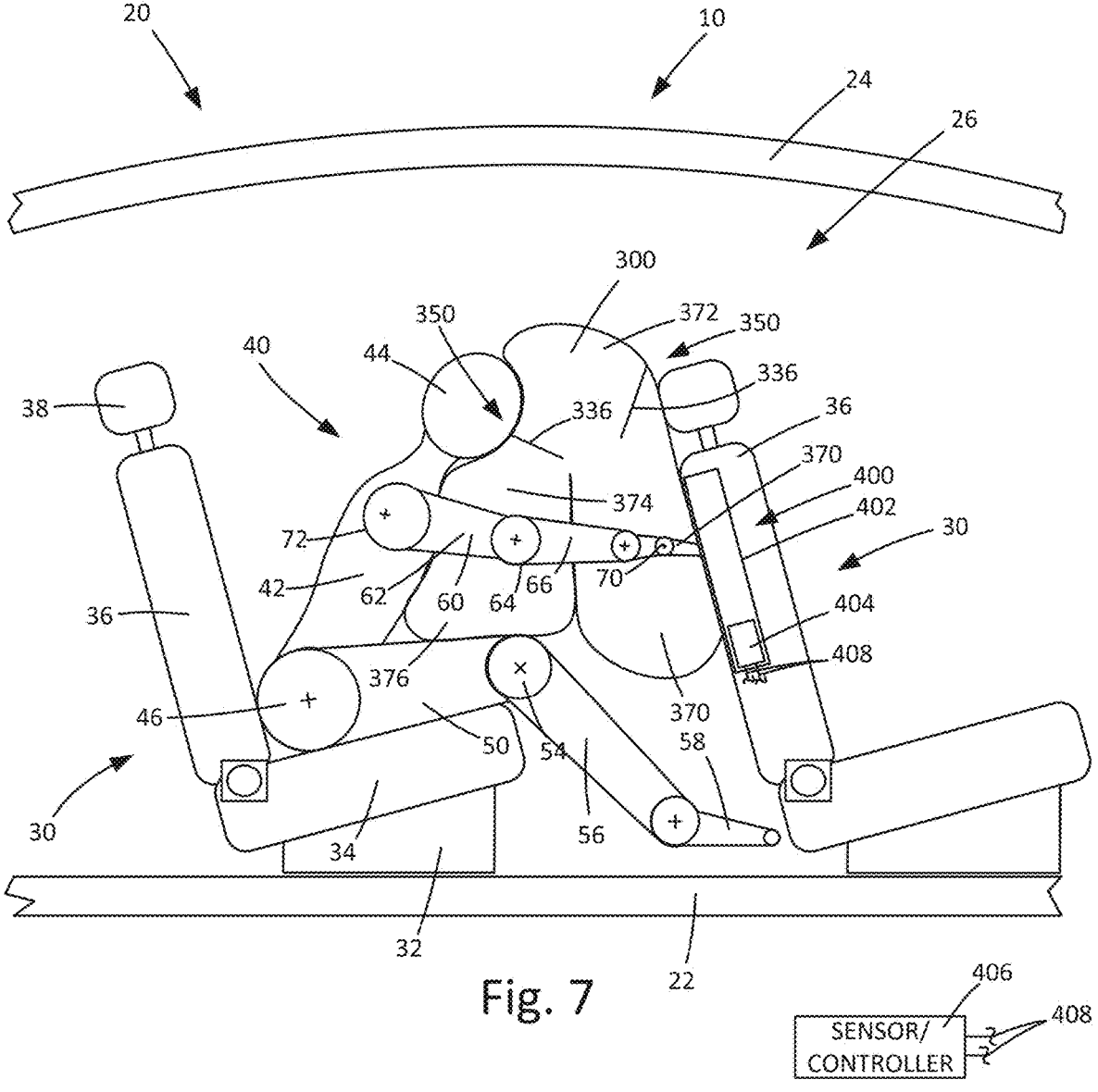
FIG. 7 is a side view illustrating the apparatus of FIG. 6 after receiving the occupant.
Figure 8:
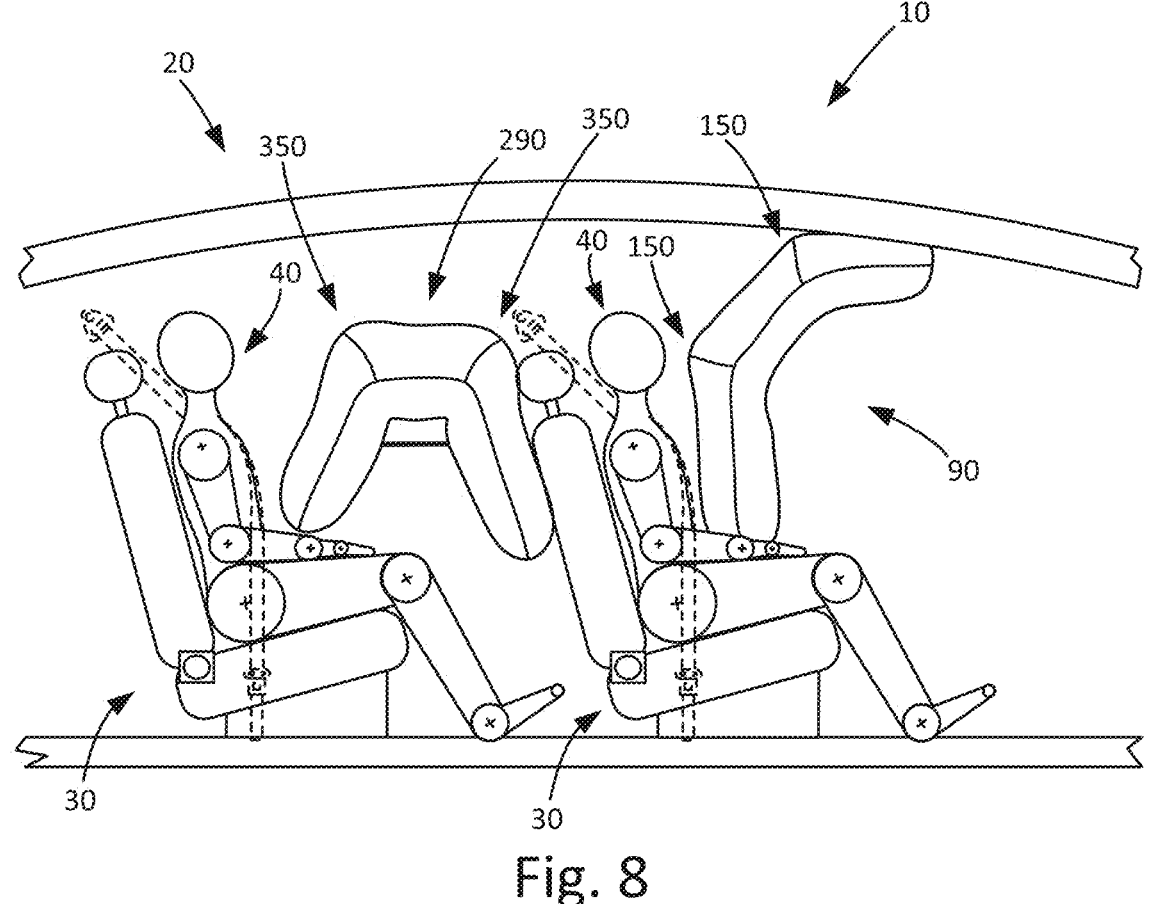
FIG. 8 is a schematic illustration of a vehicle with the apparatus of the first example configuration deployed to help protect a first row occupant, and the apparatus of the second example configuration deployed to help protect a second row occupant.

In the example configuration of the airbag 290 shown in FIGS. 5A-5D, the airbag 290 is part of an airbag module 400 that includes a housing 402 for supporting the airbag along with an inflator 404 that is actuatable to provide inflation fluid for inflating and deploying the airbag. As shown in FIGS. 6 and 7, the safety system 10 also includes a sensor/controller 406 configured to sense the occurrence of an event for which occupant protection is desired, such as a collision. In response to sensing the event, the sensor/controller 406 is operative to provide a signal for actuating the inflator 404, e.g., via lead wires 408.

The airbag 290 is shaped by the pleats 350 to form the bends 360, which are configured to position the airbag 290 extending in front of the occupant 40, with the rear bend 364 positioned in front of the occupant's head 44. As shown in FIGS. 5 and 6, the front portion 370 anchors the airbag 290 to the mounting structure, i.e., seatback 36. The middle portion 372 of the airbag 290 extends rearward toward the occupant 40 to a position in front of and covering a portion of the occupant's head 44. The rear portion 374 of the airbag 290 can also cover a portion of the occupant's head 44 and extends downward, covering the occupant's torso 42, and terminating at the occupant's upper legs 52.

The bend 364 between the middle portion 372 and the rear portion 374 is positioned with the bend facing convexly toward the occupant's head 44. Of course, this positioning of the airbag 290 relative to the occupant 40 will vary depending on the size of the occupant and the seating position of the occupant. The airbag 290 can therefore be configured to assume the illustrated inflated and deployed position for an occupant having a physiology selected according to statistics that place that person within certain segments of the population.

In development and testing of vehicle safety systems, manufacturers and safety authorities rely on statistical models and data to help quantify performance criteria and measure system performance. In doing so, reference is made to statistical vehicle occupants that represent the physical characteristics of vehicle occupants for which vehicle safety systems are meant to protect. These statistical occupants include a 50th percentile male occupant (50% male), a 95th percentile male occupant (95% male), and a 5$^{th}$ percentile female occupant (5% female).

The 50% male is derived from statistical values for the U.S. male population. The 50% male has the mean height and weight of the male U.S. population, meaning that roughly half of the U.S. male population is taller/heavier and roughly half of the U.S. male population is shorter/lighter. The 50% male is thus an average or medium sized male occupant.

The 95% male is derived from statistical values for the U.S. male population. The 95% male has a mean height and weight that is taller/heavier than roughly 95% of the male U.S. population, meaning that only roughly 5% of the U.S. male population is taller/heavier and roughly 95% of the U.S. male population is shorter/lighter. The 95% male is thus a large sized male occupant.

The 5% female is derived from statistical values for the U.S. female population. The 5% female has a mean height and weight that is taller/heavier than only roughly 5% of the U.S. female population. Conversely, this means that roughly 95% U.S. female population is taller/heavier than the 95% female. The 5% female is thus a small female occupant.

The airbag 290 can, for example, be configured to accommodate the physiology of an occupant 40 sized according to National Highway Transportation Safety Administration (NHTSA) guidelines, such as a 50th percentile male occupant, a 95th percentile male occupant, or a 5th percentile female.

The curved configuration of the airbag 20 resulting from the bends 360 formed by the pleats 350 produces a desired positioning of the airbag relative to the occupant 40 and also shapes the airbag. Due to this positioning and shaping, the surface of the airbag 290 presented facing the occupant 40, i.e., the first panel 292, is contoured so as to receive the occupant in a desired manner. The bend 362 controls the trajectory or direction at which the middle and rear portions 372, 374 deploy toward the occupant 40, as well as their final positions relative to the occupant once the airbag 290 is inflated. The bend 364 controls the curved/bent shape of the middle and rear portions 372, 374, as well as the position of the bend 362 on the airbag 290. Together, the bends 362, 364 produced by the pleats 350 are configured to position the airbag 290 and the location of the bend 364 relative to the occupant 40, as shown in FIG. 5.

The bend 364 between middle and rear portions 372, 374 of the airbag 290 is advantageous because it allows for using the structure positioned in front of the occupant 40 as a reaction surface for supporting the airbag against the forces of impact and penetration when receiving the occupant. This mounting structure can, for example, be a seatback as shown, or other structure, such as an instrument panel. When the occupant 40, restrained by the seatbelt 80, leans or bends forward in response to a vehicle collision (see FIG. 7), the rear portion 374 of airbag 290 receives the forward-moving occupant 40 and conforms to the occupant, cushioning the occupant and providing a desired ride-down effect. Because the terminal lower end 376 of the rear portion 374 is positioned in the lap/hip region of the occupant 40, the lower end of the airbag is received between the upper legs 50 and torso 42 with the forward bending of the occupant about the waist causing the rear end 376 to be "pinched" or "grasped" between the torso 42 and the upper legs 52. This prevents the airbag 290 from simply moving forward in response to the impacting occupant 40. At the same time, the structure to which the airbag 290 is mounted, i.e., the seatback 36 as shown in FIGS. 5 and 6, becomes a reaction surface for the airbag. As a result, movement, and penetration of the upper torso 42 and head 44 into the airbag 290 tends to move the rear portion 374 and middle portion 372 forward into engagement with the front portion 370, with the seatback 38 supporting the airbag 290 and allowing the airbag to absorb the occupant impact forces.

Advantageously, the pleated configuration of the airbag 290 allows for ease in folding/storage of the airbag for packaging in the airbag module 300. Referring again to FIGS. 4A-4C, the pleats 350 can be folded flat against the remainder of the airbag 290 in a variety of manners. Accordingly, the airbag 290 can easily be folded and/or rolled to place the airbag 290 in the stored condition in the airbag module 300.

What have been described above are example configurations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

We claim:

1. An airbag for helping to protect an occupant of a vehicle, comprising:
   first and second panels having substantially identical peripheries, wherein the first and second panels are positioned overlying each other and connected to each other via a perimeter connection that extends along their peripheries to define an inflatable volume of the airbag, wherein the airbag has a length and a width that corresponds to respective lengths and widths of the interconnected first and second panels;
   wherein the first panel comprises a pleat configured to form a bend in the airbag when the airbag is inflated, wherein the first panel comprises multiple panel pieces that have end portions positioned adjacent to each other and interconnected along respective edges by a panel connection that extends widthwise across the first panel between opposite longitudinally extending portions of the periphery of the first panel, wherein the interconnected edges have curved configurations such that the panel connection has a length that is greater than the width of the first panel across which the panel connection spans, which causes the area of the first panel to be greater than the area the second panel, allowing the pleat to be formed in the first panel despite the substantially identical peripheries of the first and second panels.

2. The airbag recited in claim 1, wherein the multiple panel pieces comprise a first piece and a second piece, wherein the first piece comprises a main portion with a periphery that forms a portion of the periphery of the first panel, wherein the end portion of the first piece has a periphery that does not form a portion of the periphery of the first panel, wherein the second piece comprises a main portion with a periphery that forms a portion of the periphery of the first panel, wherein the end portion of the second piece has a periphery that does not form a portion of the periphery of the first panel, wherein the end portions of the first and second pieces are connected to each other along their peripheries via the panel connection, the interconnected end portions of the first and second pieces forming the pleat, the pleat being positioned between the main portions of the first and second pieces.

3. The airbag recited in claim 2, wherein the peripheries of the end portions of the first and second pieces have matching curved configurations.

4. The airbag recited in claim 3, wherein the panel connection connecting the end portions of the first and second pieces has opposite ends that terminate at the perimeter connection on opposite sides of the airbag.

5. The airbag recited in claim 1, wherein the airbag is configured to position the bend in the airbag at a location on the airbag configured to receive the occupant's head.

6. The airbag recited in claim 1, further comprising connections that interconnect the first and second panels to define chambers within the inflatable volume of the airbag.

7. The airbag recited in claim 6, wherein the connections that interconnect the first and second panels to define chambers within the inflatable volume of the airbag comprise tethers.

8. The airbag recited in claim 1, wherein the airbag has a first end portion configured to be mounted to the vehicle structure at a mounting location on the vehicle, and wherein the bend is configured to control the shape of the airbag so that the airbag is positioned at a desired location relative to the occupant when deployed.

9. The airbag recited in claim 8, wherein the airbag comprises a first pleat configured to define a first bend in the airbag, and a second pleat configured to define a second bend in the airbag, wherein the first and second pleats define the first end portion of the airbag, a second end portion of the airbag, and a middle portion of the airbag extending between the first and second end portions of the airbag from the first pleat to the second pleat, wherein the first end portion of the airbag is configured to be mounted to the vehicle structure and to extend along the vehicle structure, the first bend is configured to cause the middle portion of the airbag to extend away from the vehicle structure toward the vehicle occupant, and the second bend is configured to cause the second end portion of the airbag to extend downward in front of the occupant.

10. The airbag recited in claim 9, wherein the vehicle structure comprises a roof of the vehicle.

11. The airbag recited in claim 9, wherein the vehicle structure comprises a seatback of a vehicle seat positioned in front of a vehicle seat upon which the occupant is seated.

12. The airbag recited in claim 11, wherein the first end portion of the airbag is configured to extend upward along the seatback, the middle portion of the airbag is configured to extend rearward from the seatback toward the occupant, and the second end portion of the airbag is configured to extend downward in front of the occupant.

13. The airbag recited in claim 9, further comprising an external tether that interconnects two of the first end portion of the airbag, second end portion of the airbag, and middle portion of the airbag.

14. The airbag recited in claim 9, wherein the airbag is configured so that the second bend is positioned in front of a head of the occupant and so that the second end portion of the airbag extends from the occupant's head down along the occupant's torso and terminates adjacent upper legs of the occupant.

15. The airbag recited in claim 14, wherein the second end portion of the airbag is configured to be impinged between the occupant's upper legs and the occupant's torso as the occupant leans forward into engagement with the airbag in response to a vehicle collision.

16. An airbag module comprising:
   the airbag of claim 1;
   an inflator that is actuatable to produce inflation fluid for inflating and deploying the airbag; and
   a housing for supporting the airbag and inflator.

17. A vehicle safety system comprising the airbag module in claim 16.

18. The vehicle safety system recited in claim 17, further comprising:
   a sensor for sensing the occurrence of an event for which deployment of the airbag is desired and producing a signal indicative thereof; and
   a controller connected to the sensor and, in response to receiving the signal, actuating the inflator to inflate and deploy the airbag.

19. The airbag recited in claim 1, wherein the perimeter connection is not required to form the pleat.

20. An airbag for helping to protect an occupant of a vehicle, comprising:
   a first panel and a second panel, the first panel comprising first and second panel pieces;
   wherein the first panel piece has a periphery including first curved edge that extends widthwise across the first panel piece between opposite edges of the first panel piece;
   wherein the second panel piece has a periphery including a second curved edge that extends widthwise across the second panel piece between opposite edges of the second panel piece;
   wherein the first and second panel pieces are connected to each other by a panel connection that connects the first curved edge to the second curved edge;
   wherein the first panel is positioned overlying the second panel and connected to the second panel by a perimeter connection that extends along the entire periphery of the second panel, wherein the first and second panel pieces are configured so that portions of their peripheries not including the interconnected first and second curved edges mate with the periphery of the second panel and are connected to the periphery of the second panel by the perimeter connection.

* * * * *